Oct. 20, 1925. 1,557,790
W. H. BARLING
MOTOR ARRANGEMENT FOR AIRCRAFT
Filed April 8, 1924
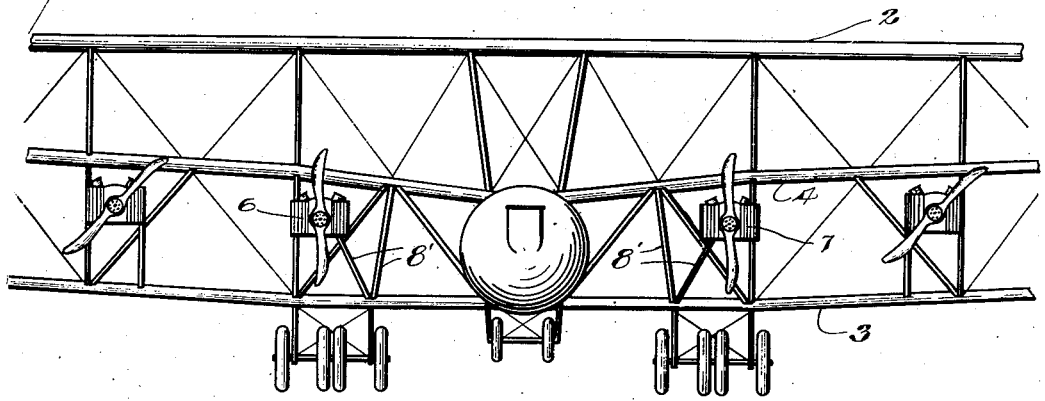
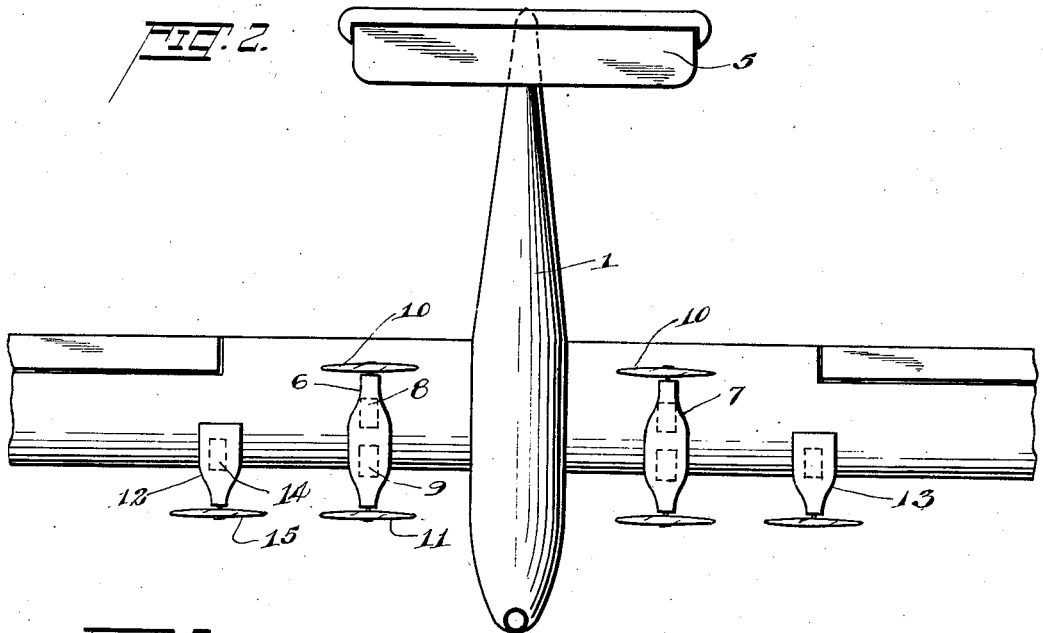
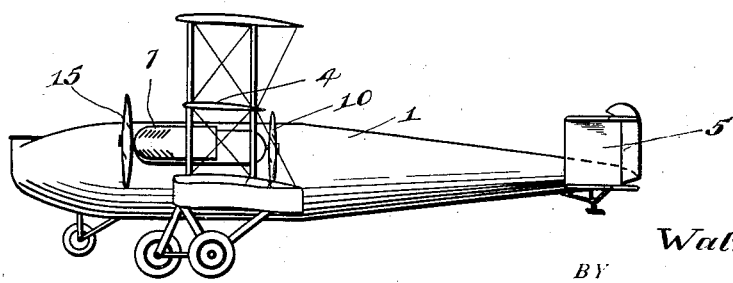
INVENTOR
Walter H. Barling
BY
Robert H. Young, ATTORNEY Patented Oct. 20, 1925.

1,557,790

UNITED STATES PATENT OFFICE.

WALTER H. BARLING, OF DAYTON, OHIO.

MOTOR ARRANGEMENT FOR AIRCRAFT.

Application filed April 8, 1924. Serial No. 705,013.

*To all whom it may concern:*

Be it known that I, WALTER H. BARLING, a subject of Great Britain, residing at Dayton, in the county of Montgomery and State of Ohio, have invented certain new and useful Improvements in Motor Arrangements for Aircraft, of which the following is a specification.

This invention relates to the motor arrangement of large aircraft. The primary object of the invention is the arrangement of the propeller units upon the aircraft so that the moments of each unit about the central vertical axis of the aircraft is the same so that there is no tendency of the aircraft to turn about a vertical axis from different units on either side of the aircraft when in use.

Further objects will be more fully set forth in the attached specification, in the claims, and in the drawings, in which:

Fig. 1 is the plan view of an aircraft embodiment with the upper planes removed.

Fig. 2 is a front elevation of the aircraft, and

Fig. 3 is a side elevation thereof.

For the purposes of illustration I have shown my invention in the form of a large airplane of the triplane type, in which two sets or units furnishing the propulsion means of the vehicle are used upon each side of the longitudinal axis of the airplane.

Referring more particularly to the drawings by reference numerals, a fuselage 1 is provided with an upper plane 2, a lower plane 3 of substantially the same size, and an intermediate plane 4 which is considerably shorter in cord length than the upper and lower planes. The usual tail surfaces 5 are provided.

Mounted one on each side of the fuselage and equally spaced therefrom are the two propelling units designated 6 and 7. These units are supported between the planes 4 and 3 by means of a suitable bracing arrangement consisting of struts 8'. Each inside propelling unit 6 and 7 comprises two motors, of preferably equal power, designated 8 and 9 which may not be coupled together. The rear motor 8 in each case drives a pusher propeller 10 and the forward motor 9 drives the tractor propeller 11, these two propellers also being of equal power and of substantially equal thrust. The pusher propellers 10 are located slightly to the rear of the trailing edge of the intermediate plane 4 so that the propeller will not interfere with this intermediate plane, but will rotate in a circular path located in front of the trailing edges of the upper and lower planes.

Arranged outside of these two inside propelling units, 6 and 7, are the two outside propeller units 12 and 13, each of which comprises a motor 14 and a tractor propeller 15. It will be understood that the power and thrust of the propellers 15 are approximately equal to the power and thrust of the propellers 10 and 11. Also that the motor 14 is of the same power as the motors 8 and 9 of the inside unit. The space between the inside propeller unit and the fuselage is arranged so that it will be equal to the space between the inside propeller unit and the corresponding outside propeller unit. In case one or both of the motors of the inside unit is mounted on a fuselage extension the same spacing would apply. Such an arrangement insures that the turning moment tending to turn the air plane about a vertical axis which will be exerted by either of the outside propeller units, will be equal to the turning moment exerted by the corresponding propeller unit inside. It will therefore be possible to use various combinations of motors and various arrangements of propeller units, at the same time without necessitating the use of the vertical rudder as a means for maintaining the airplane in a straight flight. The two outside propeller units only can be used together and the two inside units can be used together and the balance of the ship maintained, or all of the units may be used at one time. The forward inside motor may be used with a rear inside motor on the opposite side of the axis of the airplane. In addition to the above, one outside propeller unit may be used in combination with the two motors of the corresponding opposite inside propeller unit.

It will be clear that in an arrangement as just described, six motors, four, three, or two motors can be used without unbalancing the turning moments of the ship. I am aware that my invention is susceptible of use in aircraft where a great number of propeller units are used at various spacings from the longitudinal axis of the aircraft, and I do not desire my invention to be limited except as we find in the following claims.

I claim:—

1. In an aircraft in combination, a central fuselage, a supporting plane, a pair of propelling units spaced one on each side of the central longitudinal plane of the aircraft, and a second pair of propelling units spaced one on each side of the fuselage, the distance between the units of the second pair being substantially twice the distance between the units of the first said pair, and the normal power of each said first unit being substantially twice the power of each second unit.

2. In an aircraft, in combination, a central fuselage, a supporting plane, a propelling unit on each side of said fuselage each spaced a distance therefrom, a second propelling unit on each side of said fuselage each laterally removed from the first mentioned propelling unit, the normal moment of each of said first units about a central vertical axis of the aircraft being substantially equal to the normal moment of each of said second units.

3. In an aircraft, in combination, a central fuselage, a supporting plane, a propelling unit on each side of said fuselage each spaced a distance therefrom, a second propelling unit on each side of said fuselage each laterally removed from the first mentioned propelling unit, the normal moment of each of said first units about a central vertical axis of the aircraft being substantially equal to the normal moment of each of said second units, each of said first mentioned units including a tractor and a pusher propeller.

4. In an aircraft in combination a central fuselage, a supporting plane, a pair of propelling units spaced one on each side of the central longitudinal plane of the aircraft, and a second pair of propelling units spaced one on each side of the fuselage, the distance between the units of the second pair being substantially twice the distance between the units of the first said pair, and the normal power of each of said first unit being substantially twice the power of each second unit, each first mentioned unit consisting of two motors and two propellers, and each second mentioned unit consisting of a single motor and a single propeller, all of the motors being equal in power.

5. In a triplane, having a central fuselage, a large upper and lower plane, and a smaller intermediate plane having a trailing edge located forwardly of the trailing edges of the upper and lower planes, four propelling units arranged between the lower and intermediate planes and consisting of two inside propelling units located one on each side of the fuselage, and equally spaced therefrom, each of said propelling units consisting of two motors of equal power, one of said motors driving a tractor propeller located in advance of the leading edges of the planes and the second motor driving a pusher propeller located in advance of the trailing edges of the upper and lower planes, but to the rear of the trailing edge of the intermediate plane, and a second pair of propeller units spaced one on each side of the fuselage, the distance between the units of the second pair being substantially twice the distance between the units of the first mentioned propeller units, each of said second pair of propelling units consisting of a motor and a propeller of substantially equal power to that of the motors of the inside propelling units.

In testimony whereof I affix my signature.

WALTER H. BARLING.